Patented Sept. 30, 1952

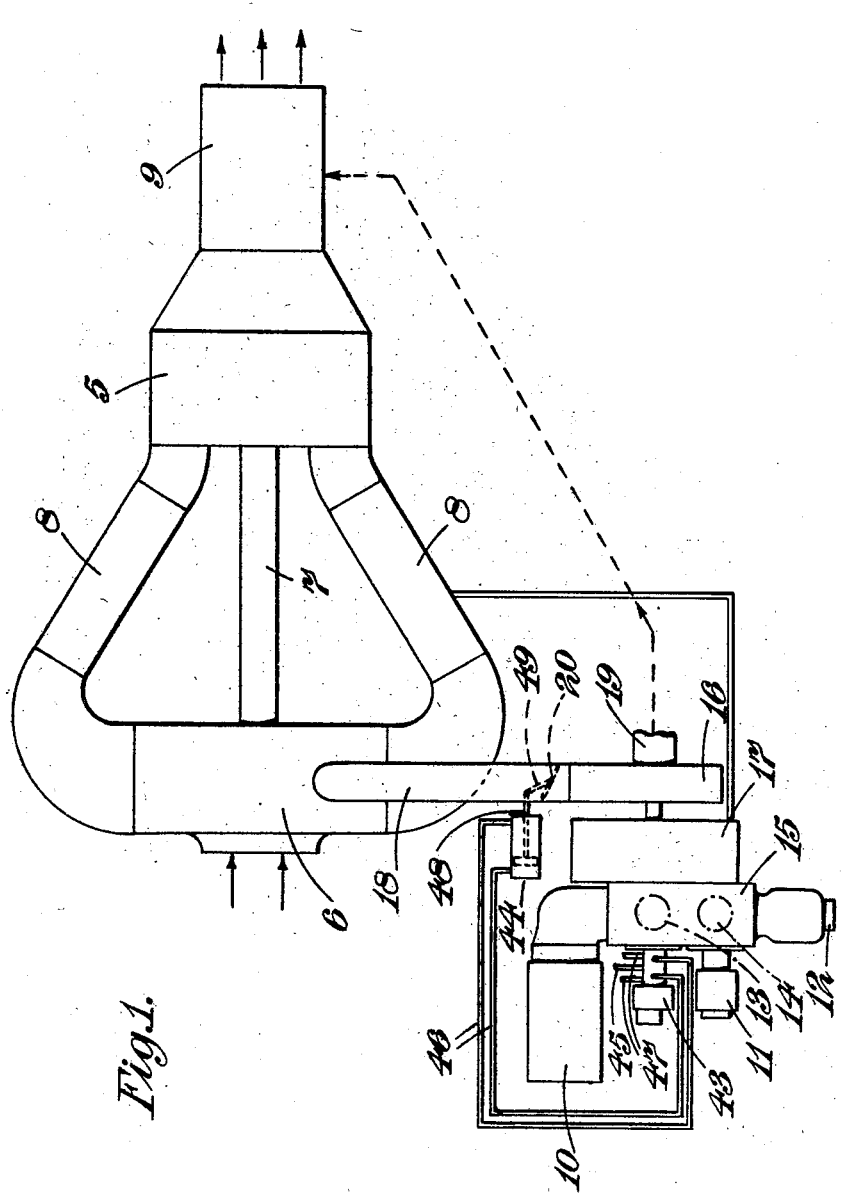

2,612,020

UNITED STATES PATENT OFFICE 2,612,020

GAS TURBINE WITH FLUID-DRIVEN AUXILIARY DRIVE

Alan Arnold Griffith, Derby, England, assignor to Rolls-Royce Limited, Derby, England, a British company Application October 29, 1946, Serial No. 706,449
In Great Britain October 4, 1945

5 Claims. (Cl. 60—39.18)

This invention concerns gas turbine power plants and has for its object to provide means for driving the auxiliary units of the power plant, the driving means being such as to enable the auxiliaries to be located substantially where desired remotely from the power plant.

A further object of the present invention is to provide a control for the driving means which is automatic and of a simple and therefore reliable nature.

A further object of the present invention is to provide a turbine for driving the accessories, and automatic means for controlling said turbine.

For convenience, the turbine of the gas turbine power plant will be referred to hereinafter as the main turbine and the turbine for driving the auxiliary units as the auxiliary turbine.

Preferably the passage of air through the auxiliary turbine is regulated by a speed responsive device driven by it. In this way the auxiliaries will be driven at a substantially constant speed which is independent of the operating conditions of the gas turbine power plant.

Figure 2A:
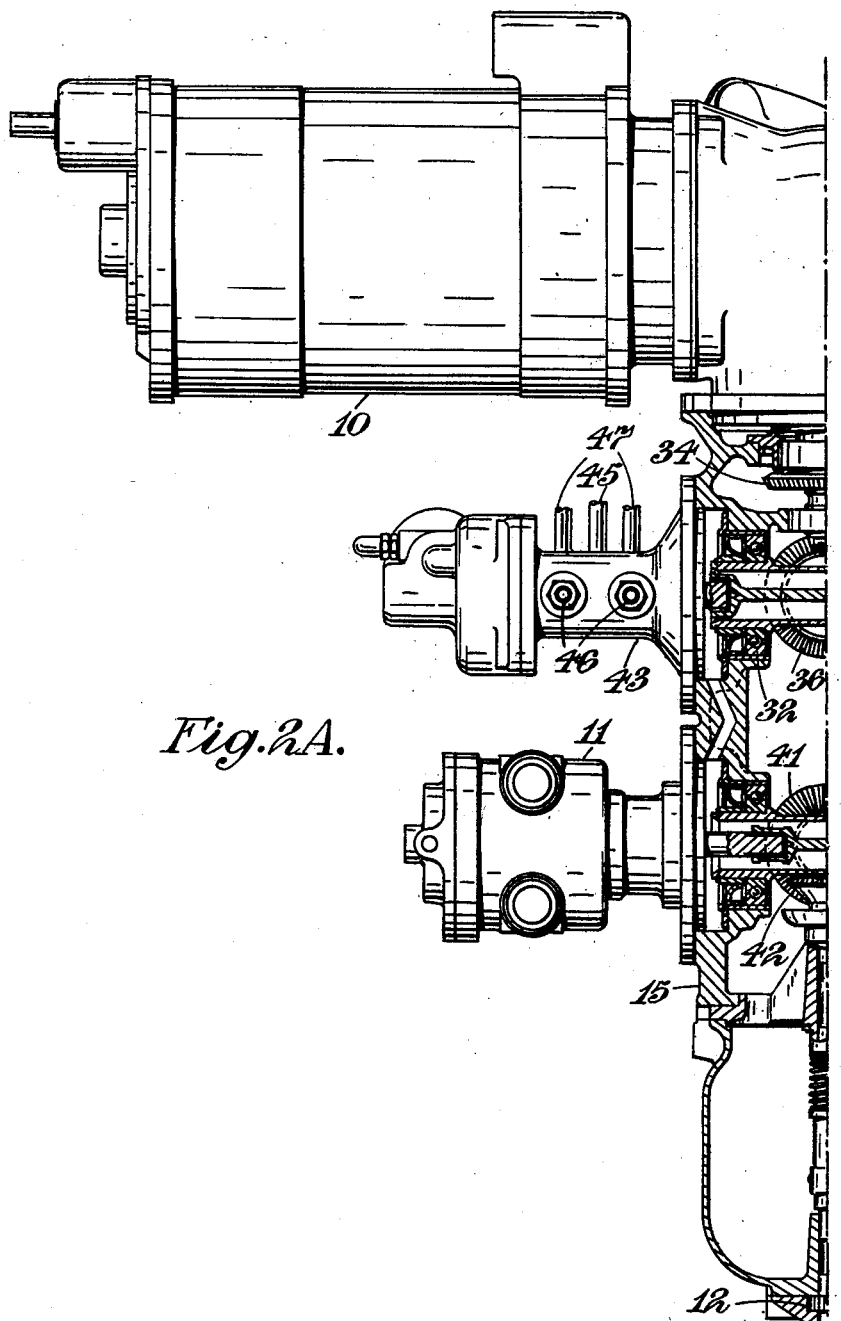
Figure 2B:
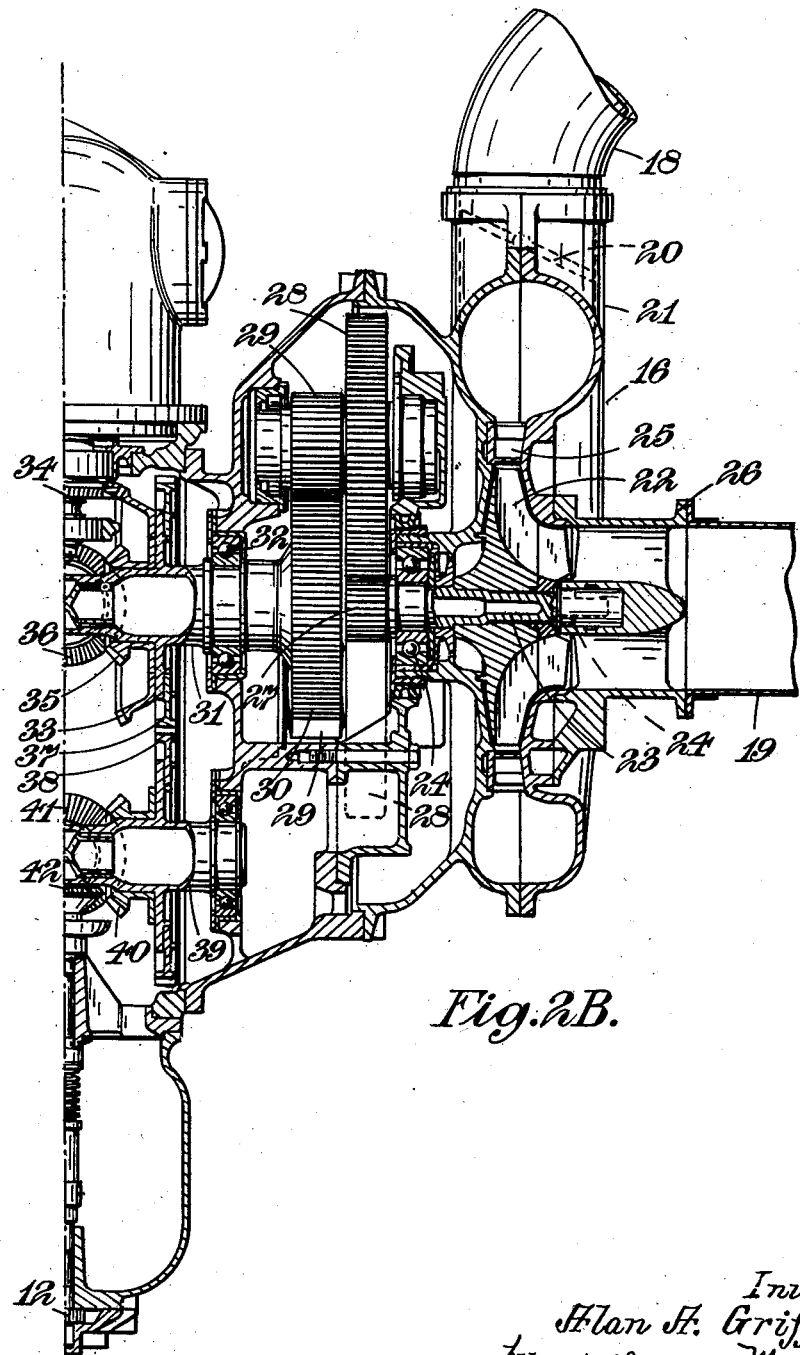

A specific embodiment of the present invention will now be described, by way of example, with reference to the accompanying drawings whereof:

Figure 1 is a diagrammatic representation of a gas turbine power plant for aircraft propulsion, and of driving means for the auxiliary units thereof in accordance with the present invention, and Figures 2A and 2B together constitute a side elevation, partly in section, of the auxiliary turbine and the drive from the latter to the auxiliaries for the gas turbine power plant.

Referring to Figure 1: the gas turbine power plant comprises a turbine 5, a compressor 6 driven by the turbine through shaft 7, a plurality of combustion chambers 8 through which the air from the compressor 6 passes to the turbine 5 and in which fuel is burnt to form the working medium of the power plant and a tail pipe 9 through which the exhaust gases from the turbine are discharged as a rearwardly directed jet by the action of which the aircraft is propelled forwardly.

Associated with the power plant is a group of auxiliary units which are required for its operation or the operation of the aircraft in which the plant is installed. These auxiliaries are for example a generator 10, a vacuum pump 11, an oil pump 12, a compressor 13 and a fuel pump 14. The auxiliary units are all secured to the casing of a gear box 15. The gear box 15 is driven by the auxiliary turbine 16 through the reduction gear generally indicated by the reference numeral 17. The drive from the auxiliary turbine 16 to each of the auxiliaries referred to will be set forth in detail hereinafter.

The turbine 16 is connected by means of a pipe 18 with the compressor 6 and by means of pipe line 19 with another part of the gas turbine power plant, for instance, the tail pipe 9. A butterfly valve 20 is disposed in pipe 18 and will regulate the flow of air from the compressor 6 to the turbine 16 and thence through pipe 19 back to the gas turbine power plant.

Referring now to Figure 2B: the auxiliary turbine 16 comprises a casing 21 which is connected with the pipe 18, a rotor 22 mounted within the casing, a shaft 23 which carries the rotor 22, bearings 24 carried by the casing 21 and supporting the shaft 23, a diffuser 25 and a connector 26 leading from the casing 21 to the pipe 19.

Air travelling along the pipe 18 from the compressor 6 enters the casing 21 and is then fed into the rotor 22 around the periphery thereof, passes therethrough along the connector 26 and so to the pipe 19. As a result the rotor 22 and its shaft 23 are rotated.

The shaft 23 carries a pinion 27 which forms one member of a reduction gear train 28, 29 and 30. The pinion 30 is carried by a shaft 31 which is supported in casing 15 by bearings 32. The shaft 31 is the input shaft of the gear box 15 and is connected through suitable gear trains with the various auxiliary units. Thus, it is connected through bevel gears 33 and 34 with the generator 10, through bevel gears 35, 36 with the compressor 13, through gears 37, 38 with layshaft 39 and thence through bevels 40 and 41 with the fuel pump 14 and through bevels 40, 41 and 42 with the oil pump 12. An extension of the shaft 39 leads to the vacuum pump 11 whilst an extension of the shaft 31 is coupled to a constant speed unit generally indicated by the reference numeral 43.

The constant speed unit 43 is of known construction and comprises a piston valve under the control of a governor which is driven by the shaft 31. The valve controls the flow of pressure fluid to and from a hydraulic motor 44 (Figure 1). Pressure fluid is applied to the piston valve of the constant speed unit 43 by pipe line 45 and the valve is in communication with the hydraulic motor 44 by pipe lines 46. Pressure fluid exhausted from the motor 44 passes through the valve and escapes by pipes 47.

With the arrangement described, the constant speed unit is adjusted to a predetermined datum speed which whilst it is maintained results in the valve remaining closed. In the event that the speed of shaft 31 departs from the datum value, the governor will actuate its valve and as a consequence will permit pressure fluid from pipe 45 to pass by one or other of pipes 46 to the motor 44. The ram of the latter is connected by linkage 48, 49 with the butterfly valve 20.

With the control described, upon a departure of speed from the datum value the valve 20 will be adjusted to reestablish this value. This control is provided since it is considered desirable that the auxiliary units be driven at a substantially constant speed which is independent of the operating conditions of the gas turbine power plant. This is particularly desirable when generators and compressors for pressurizing compartments of the aircraft are provided.

By using air derived from the compressor 6 for driving the auxiliary turbine 16 there is avoided the known problems associated with the use of a high temperature working medium for a turbine. It will be appreciated that although the above description has been made with reference to an auxiliary turbine 16 of the radial-flow type, other types of turbine may be used instead.

When starting a gas turbine power plant such as that shown diagrammatically in Figure 1 it is customary to bleed off a proportion of the air delivered by the compressor 6 in order to obtain a temporary enrichment of the fuel-air mixture entering the combustion chambers 8. The advantages associated with the driving means for the auxiliary units described above is that such enrichment may be effected and regulated by the air passing to the auxiliary turbine 16.

I claim:

1. A gas-turbine power plant comprising in combination an air compressor, combustion-apparatus, connected to be supplied directly from said air compressor, a gas-turbine connected to be supplied from said combustion-apparatus coupled to drive said air compressor, power-plant accessory means including at least a fuel pump supplying said combustion apparatus, an auxiliary air-driven turbine for driving said power plant accessory means, a fluid connecting duct between said air compressor and said air-driven turbine for conveying compressed air to drive the latter, and a fluid exhaust duct between said air-driven turbine and a space where the pressure is substantially less than that existing in said combustion-apparatus.

2. A gas-turbine power plant comprising in combination an air compressor, combustion-apparatus connected to be supplied directly from said air compressor, a gas-turbine connected to be supplied from said combustion-apparatus coupled to said air compressor to drive it, power-plant accessory means including at least a fuel pump supplying said combustion apparatus, an auxiliary air-driven turbine for driving said accessory means, a fluid connecting duct between said air compressor and said air-driven turbine for conveying compressed air to drive the latter, valve means in said fluid connecting duct, means for actuating said valve means for controlling the speed of said air driven turbine to be independent of the speed of said gas turbine, and a fluid exhaust duct between said air-driven turbine and a space where the pressure is substantially less than that existing in said combustion-apparatus.

3. A gas-turbine power plant as claimed in claim 2 wherein said means for actuating the valve means comprises a speed responsive device connected to be driven by said air turbine including a control valve, a hydraulic motor controlled by said control valve and connecting means between said hydraulic motor and said valve in said fluid duct for controlling the fluid intake to said air-driven turbine from said air compressor.

4. A gas-turbine power plant comprising in combination an air compressor, combustion-apparatus supplied thereby, a gas-turbine connected to be supplied from said combustion-apparatus and coupled to said air compressor to drive it, power plant accessory means including at least a fuel pump supplying said combustion apparatus, an auxiliary air-driven turbine for driving said power plant accessory means, a fluid connecting duct between said air compressor and said air-driven turbine for conveying compressed air to drive the latter, speed responsive means responsive to the speed of said air-driven turbine, means actuated by said speed responsive means for controlling the speed of the air-driven turbine to be independent of the speed of said gas turbine, and a fluid exhaust duct between said air-driven turbine and a space where the pressure is substantially less than that existing in said combustion-apparatus.

5. A power plant as claimed in claim 4 further comprising a throttle valve in said duct actuated by said speed responsive means.

ALAN ARNOLD GRIFFITH.

REFERENCES CITED

The following references are of record in the file of this patent:

UNITED STATES PATENTS

| Number | Name | Date |
|---|---|---|
| 2,056,198 | Lasley | Oct. 6, 1936 |
| 2,147,935 | Steiner | Feb. 21, 1939 |
| 2,318,905 | Traupel | May 11, 1943 |
| 2,336,232 | Doran | Dec. 7, 1943 |
| 2,374,510 | Traupel | Apr. 24, 1945 |

FOREIGN PATENTS

| Number | Country | Date |
|---|---|---|
| 493,174 | Great Britain | Oct. 4, 1938 |
| 398,932 | France | Apr. 6, 1909 |
| 601,964 | France | Dec. 16, 1925 |